June 16, 1953  M. L. STUDEBAKER  2,642,343
PELLETING OF CARBON BLACK
Filed April 9, 1948  2 Sheets-Sheet 1

INVENTOR.
M. L. STUDEBAKER
BY Hudson & Young
ATTORNEYS

June 16, 1953　　　M. L. STUDEBAKER　　　2,642,343
PELLETING OF CARBON BLACK
Filed April 9, 1948　　　　　　　　　　　　　　2 Sheets-Sheet 2
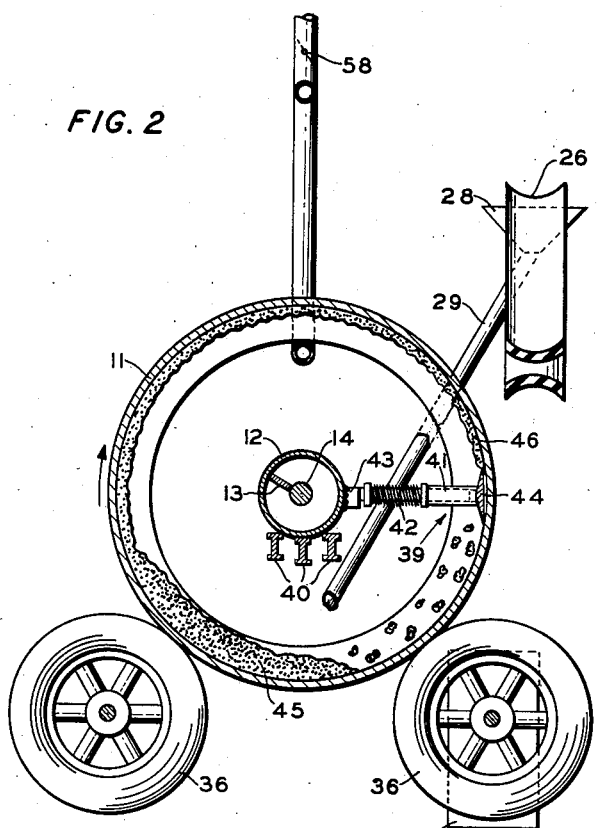
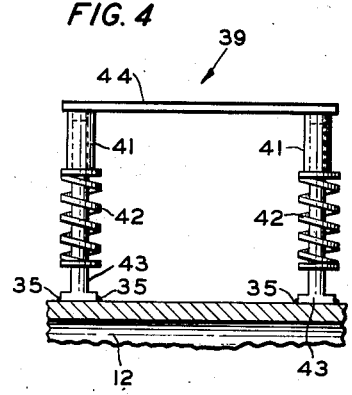
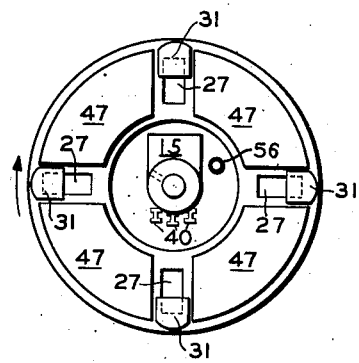
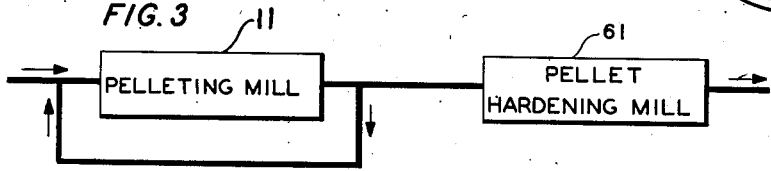
INVENTOR.
M.L. STUDEBAKER
BY Hudson & Young
ATTORNEYS Patented June 16, 1953

2,642,343

UNITED STATES PATENT OFFICE 2,642,343

PELLETING OF CARBON BLACK

Merton L. Studebaker, Bartlesville, Okla., assignor to Phillips Petroleum Company, a corporation of Delaware Application April 9, 1948, Serial No. 19,983

14 Claims. (Cl. 23—314)

This invention relates to the pelleting of carbon black. In one of its more specific aspects it relates to improvements in the dry process pelleting of carbon black. In a still more specific aspect it relates to the pelleting of chain structure carbon blacks such as high modulus furnace blacks.

The carbon black industry has for many years produced carbon black by the incomplete combustion of natural gas and other similar light hydrocarbon feed stocks. This carbon black was known generally as channel black and was produced by the well known channel process. This channel black has been referred to as hard processing or medium processing black, and sometimes as just hard black. One form of channel black is referred to as easy processing channel black. Prior to 1940 this type of black amounted to about 90% of the total carbon black produced in the United States. The carbon black produced by the channel process and its numerous modifications could be readily formed into substantially dustless granules or pellets by numerous processes well known to the art. This fine particle type of carbon black was exceptionally well suited for incorporation in natural crude rubber.

With the development of synthetic rubber such as GR-S it was found that for some purposes the fine particle channel black was unsatisfactory for compounding because of its hard processing and high heat build-up characteristics. The original channel process was modified slightly to produce a modified product sometimes called easy process black which, however, was not completely satisfactory for compounding in GR-S.

In order to produce satisfactory synthetic rubber for some purposes such as mechanical goods, extruded products, etc., it was found necessary to develop a new type of carbon black now referred to as high modulus furnace (HMF) black which is a structure carbon. This type of carbon black has the ability to maintain a chain-like grouping when dispersed in a rubber compound as contrasted to the individual particle type channel blacks which disperse more nearly completely as single discrete particles.

I use the terms chain-like grouping, chain structure or just "structure" carbon black to refer to the high modulus furnace blacks which are characterized by carbon black particles or groupings having a chain-like structure.

Chain structure carbon black may be produced by the incomplete combustion of various hydrocarbon fractions such as gas oil or more viscous asphaltic crude oil fractions, or even lighter hydrocarbons. The structure carbons so produced can not be pelletized easily by any of the well known processes used for pelleting the particle type channel black. The failure of the known pelleting processes may be due to a surface condition of the carbon black particles which condition is inherent in chain structure carbons. There does not appear to be any rigid theoretical explanation of the phenomenon.

My method for producing hard pellets from structure carbon black consists substantially of two steps, first, forming pellets from flocculent black then, second, hardening the pellets. By carrying out the pelleting operation at a high temperature I am able to about double the pellet mill capacity over what it would be if the mill were operated at atmospheric temperature or thereabouts. The second or hardening step is carried out at a greater rotational mill speed than is possible to use in pelleting. Too fast a mill speed during pelleting operations reduces the pellet bed to dust or to carbon black particles as finely divided as the original black.

An object of my invention is to provide a process for treating chain-structure carbon black to produce pellets which will withstand bulk handling and shipment.

Another object of my invention is to provide a process for the dry pelleting of chain-structure carbon black for the production of dense and hard pellets.

Still another object of my invention is to provide a pelleting process for treating chain-structure carbon blacks whereby the apparatus used will be used to its utmost capacity.

Yet another object of my invention is to provide a process wherein existing plant pelleting equipment can be used to pellet chain-structure carbon black to produce dense, hard pellets, and at a greater capacity per pelleting unit than heretofore.

These and other objects and advantages will be apparent upon reference to the following detailed description and annexed drawing which respectively describes and illustrates a preferred embodiment of my invention.

This case is related to my copending application Serial No. 589,811, filed April 23, 1945, now Patent 2,503,361, issued April 11, 1950.

In the drawing, Figure 1 is a diagrammatic representation of my pelleting apparatus, partly in longitudinal section and partly in elevation.

Figure 2 is a cross sectional view of the mill taken on the line 2—2 of Figure 1.

Figure 3 is a flow diagram showing the relation of the steps of my pelleting and hardening process.

Figure 4 is a plan view of a scraper assembly.

Figure 5 is an end elevation in part of the pellet mill with the plate 34 removed.

Figure 1:
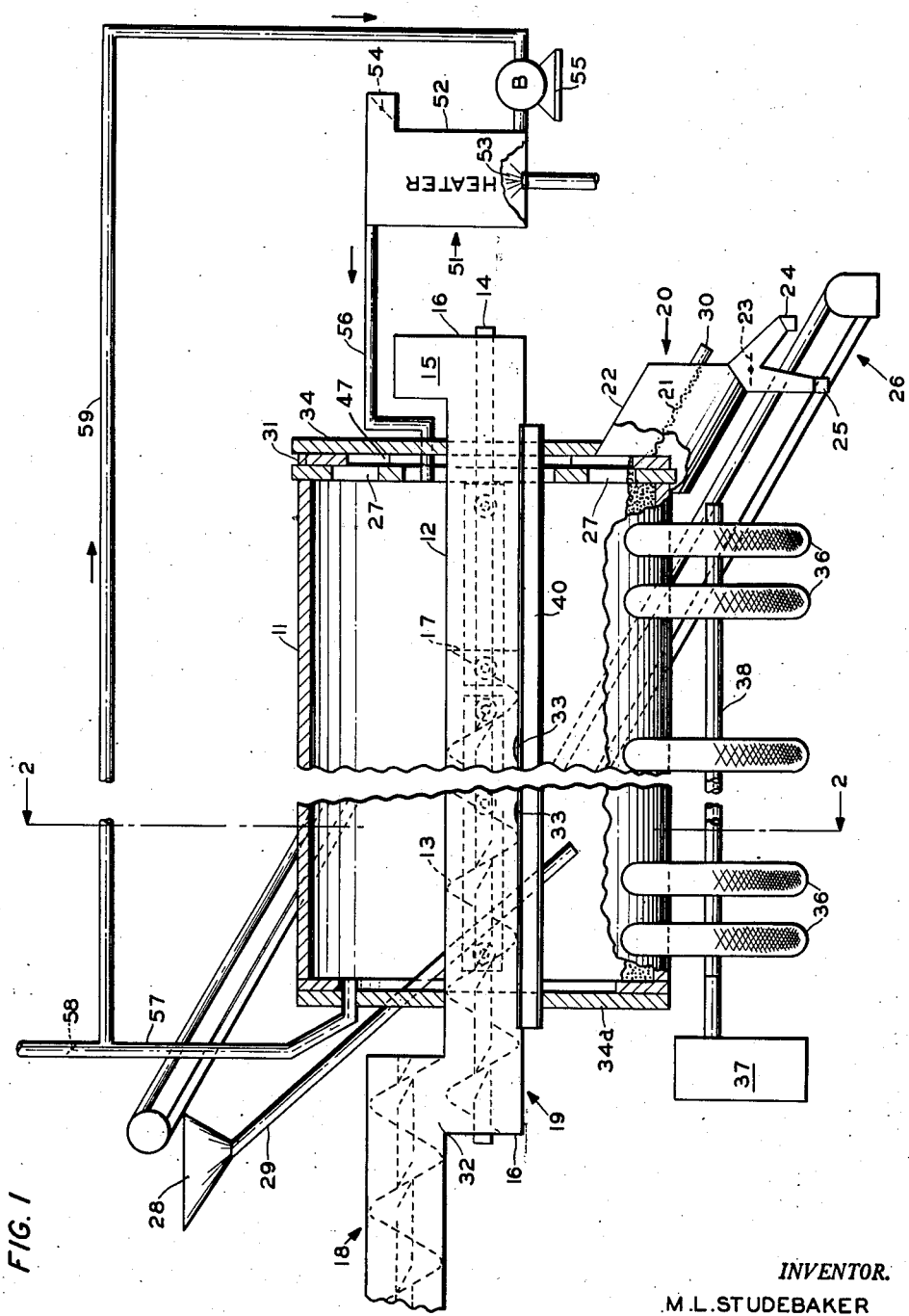

Referring now to the drawing, numeral 11 refers to an elongated hollow cylindrical container, hereinafter referred to as the pellet mill. Suspended longitudinally in this hollow cylinder and extending beyond either end is a pipe or tube 12. The upstream portion of this tube carries a helical conveyor screw 13, the shaft 14 of which extends on through the discharge end of the mill for driving or power purposes. This screw may be powered by any satisfactory source of power, represented diagrammatically by a member 15. At both ends of the conveyor pipe 12 are end plates 16 which may carry bearings for support of the screw conveyor member. At an intermediate point, longitudinally, is another plate member 17 through which the conveyor shaft extends. Conveyor 18 serves to convey the raw carbon black from a storage or from other source, not shown, through an opening 32 to the feed distribution conveyor 19. The conveyor tube 12 contains several spaced openings 33 for introduction and distribution of raw carbon black in the pellet mill. Member 20 is a hopper-like proportioning or dividing member. Openings 27 permit outflow of carbon black pellets into this dividing member. A large mesh hardware cloth 21 serves to remove coarse "scale" and foreign objects which might inadvertently be present in the discharging pelleted black. A damper-like member or other type proportioning mechanism 23 serves to divide the stream of pellets into two parts, one portion flowing through a tube 25 as product, the other flowing through a tube 24 is discharged on a conveyor, such as belt conveyor 26. This conveyor elevates and transports the recycle pellets and finally discharges them into a hopper 28 from which they flow by gravity through a tube 29 into the charge end of the pellet mill. A lid 22 serves as a protective cover to the proportioning box 20, and is so constructed that it may be raised or removed from its normal position to give access to the interior of box member 20.

Openings 27, as in Figure 5, are shown as four openings. There may be, however, only one such opening, or two, or even more than four shown, depending upon the number required to permit removal of the proper volume of carbon black pellets. Since the number of these openings in a given installation will be more or less fixed, same should be provided with slide covers 31 or other means by which the openings may be varied in size, or even closed off entirely. A tube 30 is a means for continuous removal of separated scale and foreign matter. A plate 34 covers the discharge end of the mill and is attached rigidly to the conveyor tube 12 and beams 40 for support. The lower portion of this cover plate terminates at the top of the proportioning box 22 so that opening 27 may be open for discharge of carbon black at the lower portion of its cycle. Segment plates 47 are rigidly attached to the end of the mill and radial ends of adjacent plates form guides for the slides 31. The plates 47 have the same thickness as slides 31 so that the rigid end plate 34 will fit tightly against all structural members against which it is intended to fit so that there will be a minimum of hot gas leakage from within the mill. Plates 47 are merely necessary to fill spaces between slides 31 to prevent leakage of hot gas.

The mill may be placed on rubber tired wheels 36 for support and for rotational power. At least one assembly of these supporting wheels may be keyed to a drive shaft 38 which serves to drive or rotate the mill. A second assembly of supporting wheels may be drive wheels or driven wheels, as desired. A source of power 37 for driving this wheel system and the mill may be any power means desirable or available, such as electric power, an internal combustion engine, or power may come by a belt or chain from a remote source of power.

Figure 2 is intended to illustrate the positioning of the spring loaded scraping means 39 for removal of adherent carbon black from the walls of the mill. The spring loaded scraper 39, shown in detail in Figure 4, is rigidly attached to and supported by the conveyor pipe 12 which in turn may be at least partially self supporting. However, to insure more certain rigidity of the conveyor pipe 12, especially for long pellet mills, it is well to install an auxiliary supporting means, such as I-beams 40. Scraper arm members 43 may be welded at 35 to the conveyor pipe and surrounding the arms are compression springs 42 which push sleeve members 41 carrying scraper 44 so that the latter substantially contacts the inner wall of the mill. This scraper assembly is installed to operate from such a position so that loosened scale will not fall upon conveyor tube 12 nor into the pellet bed, and so that the scraping member 44 will not interfere with the cascading bed of pellets. The scraper assembly is accordingly installed so that the loosened scale will fall freely to the bottom of the mill at a point which is substantially free from pellets and to accomplish this result the scraper is mounted approximately horizontally so that scraper member 44 contacts the wall of the cylindrical mill at a point which is traveling downward. As shown in Figure 2 the mill rotates clockwise and the scraper assembly extends to the right of the conveyor tube 12. The scraper could be mounted to extend to the "left" of the conveyor tube 12 but in this case the mill should preferably rotate "anti-clockwise."

Figure 2 shows a pellet bed 45 in the bottom of the mill and some carbon black scale 46 adhering to the walls of the mill. This bed of pellet black is shown but the scale on the mill wall is not shown in Figure 1.

Since carbon black pelleting mills are relatively long, I prefer to construct the scraper as a small unit and to use as many units as necessary dependent upon the length of mill wall to be kept clean.

In this respect I have made such scrapers in approximately six foot lengths, so that in a 24 foot mill, four such individual scrapers are required; and in a 48 foot mill eight units are used. At least a quarter or half inch clearance should be allowed between the ends of successive scraper members 44 so that successive members 44 will not touch one another.

A heating apparatus such as that referred to by reference numeral 51 is satisfactory for maintaining the black at the temperature required for optimum pelleting, as herein disclosed. Such an apparatus may consist of a heater chamber 52 containing a burner 53. From the heater chamber hot gasses at from 300° to 600° F. are forced through a pipe 56 under influence of a blower 55 into the outlet end of the pellet mill 11 as illustrated. Gases leave the mill by an outlet pipe 57 to be returned by a return pipe 59. The gases not needed to be returned may be vented from the heating system by a damper 58. The combustion gases are tempered to the desired temperature prior to passage into the pellet mill by admission of the required amount of air admitted through a damper 54.

The hardening mill 61 is for the most part a hollow cylindrical drum supported and rotated in the same manner as the pellet mill. This hardening mill is equipped with scrapers similar to the scrapers 39 illustrated in Figures 2 and 4. There is no screw conveyor in this mill since all the black is added in pellet form and may be introduced through an inlet chute arrangement similar to inlet 28, 29 of Figure 1. The outlet end may be provided with a bed depth regulating means and an outlet means similar to those illustrated in Figure 1 in conjunction with the pellet mill.

In the operation of my herein disclosed pellet mill, raw, undensed carbon black is fed by the screw conveyor 18 or other suitable conveying means into conveyor 19 through the feed opening 32. This raw carbon black may come directly from the production furnaces by way of bag filters or an electro precipitator or from an intermediate or "run" storage, and may be undensed black weighing about 3 pounds per cubic foot. Conveyor 19 picks up the feed and actually transfers it into the pellet mill by way of one or more openings 33 in the bottom side of the conveyor tube 12. As the mill revolves about its longitudinal axis this newly added black adheres to the surface of the pellets in this feed end of the mill. A full charge of pellets is present at all times in the feed end of the mill as a result of a rather large recycle ratio. Sufficient pelleted product is recycled to maintain a bed depth of about 6 inches in the pellet mill. The position and size of the pellet outlet openings 27 also affect the bed depth.

In a mill 6 feet in diameter by 48 feet in length, when operated according to conventional methods, about 1000 pounds per hour of black is introduced to the pellet mill as feed, 1000 pounds per hour is withdrawn as pelleted product and about 2000 pounds of pellets per hour being returned as recycle.

In the process of this invention I am able to pellet the chain structure black at about double the above mentioned rate, that is, 2000 pounds per hour when the charge in a mill of the same size is maintained at a temperature of about 200° F. The recycle rate may be kept the same, that is, 2000 pounds of pellets are recycled per 2000 pounds of production per hour, giving a recycle ratio of 1:1. This recycle ratio may vary on either side of the 1:1 ratio, for example, it may vary from about ½:1 to 2:1 and yet give the increased pellet production of superior quality pellets.

The number and position of the feed openings 33 in the bottom of the conveyor tube 12 may vary within rather wide limits and yet produce pellets of good quality. In case one feed opening is used, the amount of raw black fed therethrough may be limited since too much flocculent black at any one point may tend to make the pellets too large and of improper density and accordingly unstable. By this term "unstable" is meant that the pellet is not sufficiently hard to withstand compacting or subsequent handling. Such pellets frequently disintegrate or break up in the downstream end of the mill during polishing and compacting.

Better pellets seem to be the result of small additions of raw black to pellets or nuclei already formed. Thus, a preferable method of raw black addition is to make several additions of relatively small quantities of black with at least a short period of compacting during which substantially no new black is added. Thus by proper spacing of the feed openings 33, this operation is achieved. I have found that such spacings as 6, 18 and 33 feet from the inlet end of the mill with approximately equal additions of raw black through each of these spaced openings, yielded good quality pellets. The plate 17 in conveyor tube 12 in addition to furnishing a bearing for the conveyor screw shaft 14 serves as a stop to prevent passage of flocculent black toward the drive end of the shaft.

The pellet discharge openings 27 may be fully open or may be closed in part by the slide covers 31. Openings 27 may be substantially any size desired, provided they are sufficiently large to permit discharge of a maximum quantity of pellets. Preferably, these openings should be larger than necessary so that slides 31 may at least in part control the effective opening of 27. In addition it is intended that in raising or lowering slides 31 that the effective opening may be raised or lowered with respect to the cylindrical wall of the pellet mill. By this adjustment the pellet bed depth may be controlled to increase or decrease the pressure on the pellets in process and to increase or decrease the residence time in the mill, as desired.

From these pellet discharge slots 27 the pelleted black falls upon a coarse hardware cloth for removal of large pieces or fragments of carbon black scale which have broken off or have been scraped off the interior wall of the mill. Since the actual pellets are usually about one eighth inch or less in diameter the use of this quarter inch mesh hardware cloth exerts no sizing effect whatever on the pellets.

The pelleted material free from scale and foreign matter is divided or proportioned by divider 23. This divider may be similar in structure to a damper or butterfly type valve, or any other kind of a proportioner or divider adapted to handle material of the nature of pelleted carbon black. This divider 23 is so adjusted as to divide out about 2000 pounds per hour of pellets when the feed rate to the mill is approximately 2000 pounds of raw black per hour. The 2000 pounds of pellets per hour pass through tube 24 to the belt or other conveyor or elevator 26 for transfer to the inlet end of the mill. These pellets are discharged into the hopper 28 and pass through the tube 29 into the mill.

The remaining portion of the pellets cut out by the divider 23 pass by way of conduit 25 to storage or other disposal, as desired, or to the hardening mill of my invention.

The entire pellet mill may be supported on a system of rubber tired wheels both for purposes of support and purposes of rotation. The number and size of the tired wheels, both driving and driven may be selected from an engineering consideration to give the best operation.

The pelleting process of this invention is especially adapted to the pelletizing of conductive high modulus furnace, or chain structure carbon blacks. The loose fluffy black produced by the incomplete combustion of a gas oil, cooled and separated from the combustion products is fed to the first of a series of two rotary mills. The loose black may all be discharged at one point near the front of the mill, however, with structure carbon black it will usually be preferred to discharge the loose black at several points distributed along the longitudinal axis of the mill. This mill is continuously rotated about its longitudinal axis at a speed of about 5 R. P. M. to about 12 R. P. M. The speed of rotation will be determined by the mechanical design features of the mill as well as by other operating conditions discussed hereinafter. In pelleting structure carbon black it is usually necessary to provide seed or nuclei, otherwise the loose black will have a tendency to form relatively large unstable balls. Therefore in initiating the operating of this pelleting mill a small quantity of seed pellets will ordinarily be provided from an outside source. After operation has been established the pellets discharged from the mill are divided with a portion of the pellets being recycled to maintain the seed bed and the remainder form an intermediate product. This intermediate product may be marketed as such, however, with structure carbon black the pellets at this stage are usually so soft or subject to disintegration and dusting that the pellets will require special packaging. Provisions for packaging the material will increase the capital investment in the plant as well as the cost of producing the product. Consequently it will usually be desirable to treat this intermediate product in the second step of my process.

I have found that the characteristics of conductive HMF carbon black change remarkably with temperature. At ordinary temperatures, that is, up to about 150° F. structure carbon black displays the characteristics of a comminuted solid. As the temperature is increased to about 200° F., or above, the characteristics of the black change to such an extent that it becomes more like a hydraulic fluid rather than a comminuted solid. The theories underlying this unusual behavior are not understood, however, I have discovered that this phenomenon has a very unexpected influence on the pelleting of the black. By operating the pellet mill at a temperature of about 200° F. or above, the hardness, friability and density of the intermediate or first product are increased. Some of the benefits may be noted at temperature of about 175° F. but I prefer to operate at a temperature in the range of about 200° F. to about 225° F. Temperatures as high as about 300° F. may be used without deleterious effect, however, the additional benefits of the higher temperatures usually do not justify the additional heating costs. The pellet bed which is being maintained at the controlled temperature may vary in depth from about 4 inches to about 16 inches, however, the preferred bed depth usually ranges from about 5 inches to about 8 inches. The temperature may be controlled by the addition of heat to the loose black prior to its entry into the mill, however, under most conditions these exterior heating means are not satisfactory because of the loss of heat from the large recycle volume of pellets. Heat may be supplied by any well known electrical heating devices attached to or installed on the outer shell of the mill. These devices are not too satisfactory because of the size of the mill which may be 6 to 10 feet in diameter and as much as 48 feet long and, furthermore, the mill is being rotated. A preferred heating means which has been used successfully on a pellet mill handling structure carbon black involves the use of combustion products or flue gases which are generated in any well known type of gas fired furnace, such as a Dutch oven. The flue gases are tempered to a desired temperature in the range of 300° F. to 600° F. and circulated through the mill by means of a blower. The quantity of flue gas recycled through the furnace for reheating is controlled by bleeding off a portion of the gas to a stack or other disposal means.

In addition to the improved characteristics of the pelleted product as noted hereinabove, I have also found that the capacity of a given pellet mill was increased about 100 per cent by operating in the temperature range of 200° F. to 225° F. over its capacity when operating at temperatures below 175° F.

Example 1

A conductive H. M. F. carbon black was produced by the incomplete combustion of a recycle gas oil type hydrocarbon fraction of about 18° A. P. I. gravity.

The loose black was fed to a 6 foot by 48 foot mill which was rotated at 10 R. P. M. and operated with pellet recycle ratio of 1/1 and the following unexpected results were observed as the operating temperature was varied.

|  | 150° F. | 200° F. |
|---|---|---|
| Loose Black Feed rate, lbs./hr | 1,000 | 2,000 |
| Product Density, lbs./cu. ft | 21 | 23 |

The increase in density of the pellets produced at 200° F. is not much when considered from the point of view of a single cubic foot of pellets, but when considered from the point of view of a freight car load, a good many more pounds of the 23 pound pellets can be shipped per car than when shipping 21 pound black.

A further advantage in the practice of the process of my invention is that in producing the 23 pound per cubic foot pellets, the product pellets are actually denser and resist breakage in handling and in shipment to a greater extent than do 21 pound per cubic foot pellets.

As pointed out hereinabove, the pellets produced in my first mill may be marketed as a commercial product but, even though pelleted, the product may require packaging since the pellets may not be sufficiently hard to withstand handling in bulk. I have found that these pellets may be hardened sufficiently to withstand bulk shipment in tank cars. It is possible to achieve this unexpected result by passing the pellets from the first pellet mill into a second mill which may be of the same size and general design as the first mill. This second mill can not be considered as a pellet mill because there is no loose black feed to the mill. The mill must be operated at a speed substantially in excess of the maximum allowable speed which will permit pellet formation with this structure carbon black.

The following example illustrates optimum conditions for the pelleting operation and for the hardening operation.

Example 2

|  | Pellet Mill | Hardening Mill |
|---|---|---|
| Mill Size feet | 6 x 48 | 6 x 48 |
| Loose Black Feed, lbs./hr | 2,000 | none |
| Recycle Ratio | 1/1 | none |
| Pellet Bed Depth inches | 6 | 8 |
| Mill Speed, R. P. M. | 10.5 | 14.5 |

My process differs from the known processes in that I have discovered a process for hardening structure black pellets which involves subjecting these pellets to an increased shearing force. It will be readily apparent to those skilled in the art, that the individual pellets forming a pellet bed in a given mill, such as a 6 foot diameter mill, will be subjected to a much greater shearing force when this mill is rotated at 14.5 R. P. M. than when the same mill is rotated at 10.5 R. P. M. In pelleting structure black it is known that an excessive shearing force will prevent the formation of pellets from loose black and pellet seed, in fact the pellet forming bed will be reduced to dust. With a 6 foot diameter mill, I have found that the maximum allowable shearing force is developed at a rotational speed of about 12.5 R. P. M. for this specific mill. Good pellets may be formed in this mill at rotational speeds from about 5 R. P. M. to about 12.5 R. P. M. in accordance with the first step of the process of this invention. However, if the speed is increased above about 12.5 R. P. M., the formation of pellets will cease and any pellets previously formed will be disintegrated and reduced to dust.

The pellets formed in the first mill are passed to a second mill which is operated at a higher speed than the pellet forming mill. With a 6 foot mill the preferred speed is considerably in excess of about 12.5 R. P. M. A satisfactory speed has been found to be in the range of about 13.5 R. P. M. to about 16 R. P. M. Speeds in excess of 16 R. P. M. will produce further hardening of structure black pellets, however, further increases in speed will usually be limited by the mechanical design of the mill. It will be understood that with mills of smaller diameter that higher speeds are permissible and that such increased speed will be necessary to produce the equivalent shearing force. Likewise with larger mills, of increased diameter, the maximum speed will be lower. I have found, however, that structure black pellets may be hardened sufficiently to permit satisfactory handling in bulk by subjecting the pellets to a shearing force of about 120% to about 200% of the maximum allowable force which will permit the initial formation of the pellets, and this shearing force is measured in terms of the mill speed.

While I am not limited by any theory of how pelleting or pellet hardening occurs, perhaps the major pellet forming action in pelleting mill 11 and the major pellet hardening action in pellet hardening mill 61 is due to forces acting on the pellet during the process of cascading or tumbling of the pellets, this cascading being due to the action of gravity on the pellets in pellet bed 45 as shown in Figure 2. As the drum 11 rotates clockwise the bed 45 builds up high on the left side until the angle of repose of the pellets in said bed is exceeded. Then the upper portion of the pellets (not adhering to drum 11) cascades, or tumbles, down the sloping bed 45 to the right side of Figure 1. More violent and more rapid cascading is possible in pellet hardening mill 61 without undue pellet destruction than would be possible in pellet mill 11, and I have discovered that such rapid cascading in the pellet hardening mill as would be deleteriously destructive of pellets in the pelleting mill, is of unexpected value in hardening the pellets.

It will be obvious to those skilled in the art that many variations and alterations in specific operating conditions and mill design may be made and yet remain within the intended spirit and scope of my invention.

I claim:

1. A dry process for producing pellets of chain structure carbon black which are sufficiently hard to withstand bulk shipment, comprising the steps of introducing unsized dry carbon black pellets as subsequently produced and containing all sizes of pellets into the inlet end of an elongated, horizontally disposed hollow cylinder having an inlet end and an outlet end with respect to carbon black flow, introducing dry flocculent chain structure carbon black into said cylinder at an intermediate point but relatively closer to said inlet end, maintaining the carbon black in the cylinder at a temperature between 175° and 300° F., rotating said horizontally disposed hollow cylinder around its longitudinal axis at an optimum rate for pellet formation, withdrawing carbon black pellets of a mixture of sizes up to ⅛ inch in diameter from the outlet end of said cylinder, dividing said pelleted carbon black into two portions, each portion containing said mixture of sizes of pellets up to ⅛ inch in diameter, recycling one portion to the inlet end of the hollow cylinder as the carbon black pellets subsequently produced at such a rate as to maintain a recycle rate of at least ½ to 1 and passing the other portion of said carbon black pellets containing all sizes of pellets up to ⅛ inch in diameter into the inlet end of an elongated, horizontally disposed hollow cylindrical vessel having an inlet end and an outlet end with respect to the flow of carbon black, rotating this cylindrical vessel around its longitudinal axis at a speed greater than the maximum rate of rotation for pellet formation, and withdrawing carbon black pellets from the outlet end of said cylindrical vessel as the product of the process.

2. The process of claim 1 wherein the first mentioned hollow cylinder is six feet in diameter and this cylinder is rotated at a speed of 5 to 12½ R. P. M., and the second hollow cylindrical vessel is about six feet in diameter and this vessel is rotated at a speed of 13½ to 16 R. P. M.

3. A process for hardening pellets of chain structure carbon black comprising introducing pellets of dry chain structure carbon black into the inlet end of an unobstructed horizontally disposed elongated hollow cylindrical vessel having an inlet end and an outlet end with respect to carbon black pellet flow, rotating said cylindrical vessel around its longitudinal axis at a speed greater than the maximum permissible speed of rotation for the formation of pellets from flocculent chain structure carbon black, and removing hardened chain structure carbon black pellets from the outlet end of said vessel as the product of the process.

4. A dry process for pelleting flocculent chain structure carbon black comprising cascading carbon black pellets as subsequently produced, then adding flocculent chain structure carbon black to the cascaded pellets while maintaining a temperature above 175° F., further cascading the mixture of carbon black pellets and flocculent black at said temperature, dividing pelleted material from the last-mentioned cascading step into two portions, returning one portion to the process as the carbon black pellets subsequentially produced at such a rate as to maintain a recycle ratio of at least ½ to 1, and removing the other portion as the product of the process.

5. The process of claim 4 wherein the temperature of the carbon black undergoing pelleting is maintained at a temperature between the limits of 200° and 225° F.

6. A dry carbon black pelleting process for pelleting flocculent chain structure carbon black comprising continuously cascading compacted chain structure carbon black pellets containing pellets up to ⅛ inch in diameter as subsequently produced, adding to these cascading carbon black pellets a minor proportion by weight of dry, flocculent carbon black at a plurality of spaced points intermediate the ends of the cascading zone while maintaining a temperature above 175° F., compacting the pellets with the added flocculent black by cascading following each point of addition of the flocculent black and prior to the next successive point of addition of flocculent black, compacting the pellets by cascading following the final point of addition of said flocculent black, maintaining said cascading bed of pellets at a temperature above 175° F., dividing the finally cascaded pellets into two portions, each portion containing pellets up to said ⅛ inch diameter, returning one portion to the process as the first mentioned carbon black pellets up to ⅛ inch diameter as subsequently produced at such a rate as to maintain a recycle ratio within the limits of ½ to 1 and 2 to 1, and removing the other portion containing said sizes as the product of the process.

7. A dry carbon black pelleting process for pelleting flocculent chain structure carbon black comprising continuously cascading compacted chain structure carbon black pellets containing pellets up to ⅛ inch in diameter as subsequently produced, adding to these cascading carbon black pellets at a region intermediate the ends of the cascading zone a minor proportion by weight of dry, flocculent carbon black at a temperature above 175° F., compacting the pellets by cascading following the addition of said flocculent black, maintaining said cascading bed of pellets at a temperature above 175° F., dividing the finally cascaded pellets into two portions, each portion containing pellets up to said ⅛ inch diameter, returning one portion of the process as the first mentioned carbon black pellets up to ⅛ inch diameter as subsequently produced at such a rate as to maintain a recycle ratio of at least ½ to 1, and removing the other portion containing said sizes as the product of the process.

8. A dry process for producing pellets of chain structure carbon black which are sufficiently hard to withstand bulk shipment, comprising the steps of introducing unsized dry carbon black pellets as subsequently produced and containing all sizes of pellets into the inlet end of an elongated, unobstructed horizontally disposed hollow cylinder having an inlet end and an outlet end with respect to carbon black flow, introducing dry flocculent chain structure carbon black into said cylinder at an intermediate point but relatively closer to said inlet end, rotating said horizontally disposed hollow cylinder around its longitudinal axis at an optimum rate for pellet formation, withdrawing carbon black pellets of a mixture of sizes up to ⅛ inch in diameter from the outlet end of said cylinder, dividing said pelleted carbon black into two portions, each portion containing said mixture of sizes of pellets up to ⅛ inch in diameter, passing one portion to the inlet end of the hollow cylinder as the carbon black pellets subsequently produced at such a rate as to maintain a recycle ratio within the limits of ½ to 1 and 2 to 1, and passing the other portion of said carbon black pellets containing all sizes of pellets up to ⅛ inch in diameter into the inlet end of an elongated, horizontally disposed hollow cylindrical vessel having an inlet end and an outlet end with respect to the flow of carbon black, rotating this cylindrical vessel around its longitudinal axis at a speed greater than the maximum rate of rotation for pellet formation, and withdrawing carbon black pellets from the outlet end of said cylindrical vessel as the product of the process.

9. The process of claim 8 wherein the first mentioned hollow cylindrical is six feet in diameter and this cylinder is rotated at a speed of 5 to 12½ R. P. M., and the second hollow cylindrical vessel is six feet in diameter and this vessel is rotated at a speed of 13½ to 16 R. P. M.

10. A dry process for producing hardened carbon black pellets from flocculent chain structure carbon black comprising cascading carbon black pellets as subsequently produced at a temperature above 175° F., then adding unpelleted flocculent chain structure carbon black to the cascaded material, further cascading the carbon black pellets and added flocculent black at said temperature, dividing the further cascaded material into two portions, recycling one portion to the process as the carbon black pellets subsequently produced so as to maintain a recycle ratio of at least ½ to 1, still further cascading the other portion of said material at a rate faster than the maximum rate for pellet formation, and removing pellets from the last cascading step as the product of the process.

11. A dry process for producing hardened carbon black pellets from flocculent chain structure carbon black comprising cascading carbon black pellets as subsequently produced at a temperature between the limits of 175° and 300° F., then adding unpelleted flocculent chain structure carbon black to the cascaded material, further cascading the carbon black pellets and added flocculent black at said temperature, dividing the further cascaded material into two portions, recycling one portion to the process as the carbon black pellets subsequently produced so as to maintain a recycle ratio of at least ½ to 1, still further cascading the other portion of said material at a rate faster than the maximum rate for pellet formation, and removing pellets from the last cascading step as the product of the process.

12. A dry process for producing hardened carbon black pellets from flocculent chain structure carbon black comprising cascading carbon black pellets as subsequently produced at a temperature between the limits of 200° and 225° F., then adding unpelleted flocculent chain structure carbon black to the cascaded material, further cascading the carbon black pellets and added flocculent black at said temperature, dividing the further cascaded material into two portions, recycling one portion to the process as the carbon black pellets subsequently produced so as to maintain a recycle ratio of at least ½ to 1, still further cascading the other portion of said material at a rate faster than the maximum rate for pellet formation, and removing pellets from the last cascading step as the product of the process.

13. A dry process for pelleting flocculent chain structure carbon black which comprises continuously rotating a hollow unobstructed cylindrical mill containing carbon black pellets, introducing dry flocculent chain structure carbon black into the mill at a zone intermediate the ends thereof to effect agglomeration of the flocculent black into pellets, continuously withdrawing pellets from said mill and introducing them into a second hollow cylindrical mill, rotating said second mill about its longitudinal axis at a speed faster than the maximum permissible speed for the formation of pellets from flocculent chain structure carbon black, and removing hardened pellets from the second mill as the product of the process.

14. A dry process for pelleting flocculent chain structure carbon black which comprises continuously rotating a hollow unobstructed cylindrical mill containing carbon black pellets, introducing dry flocculent chain structure carbon black into the mill at a zone intermediate the ends thereof to effect agglomeration of the flocculent black into pellets, continuously withdrawing pellets from said mill, recycling a portion of the withdrawn pellets so as to maintain a recycle ratio of at least ½ to 1, introducing another portion of the withdrawn pellets into a second hollow cylindrical mill, rotating said second mill about its longitudinal axis at a speed faster than the maximum permissible speed for the formation of pellets from flocculent chain structure carbon black, and removing hardened pellets from the second mill as the product of the process.

MERTON L. STUDEBAKER.

References Cited in the file of this patent

UNITED STATES PATENTS

| Number | Name | Date |
|---|---|---|
| 2,120,540 | Billings et al. | June 14, 1938 |
| 2,164,164 | Price | June 27, 1939 |
| 2,311,154 | Carney | Feb. 16, 1943 |
| 2,422,989 | Skoog | June 24, 1947 |
| 2,503,361 | Studebaker | Apr. 11, 1950 |